(12) United States Patent
Lin et al.

(10) Patent No.: US 10,922,407 B2
(45) Date of Patent: Feb. 16, 2021

(54) DISCRIMINANT POWER BASED THREAT DETECTION

(71) Applicant: International Business Machines Corporation, Armonk, NY (US)

(72) Inventors: Raymund Lin, Taipei (TW); Charlie Wu, Taipei (TW); Youngja Park, Princeton, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 16/194,536

(22) Filed: Nov. 19, 2018

(65) Prior Publication Data

US 2020/0159920 A1    May 21, 2020

(51) Int. Cl.
    *G06F 21/56*    (2013.01)
(52) U.S. Cl.
    CPC .......... *G06F 21/561* (2013.01); *G06F 21/562* (2013.01); *G06F 2221/034* (2013.01)
(58) Field of Classification Search
    CPC ................. G06F 21/561; G06F 21/562; G06F 2221/034; G06F 21/56
    See application file for complete search history.

(56) References Cited

U.S. PATENT DOCUMENTS

| | | | |
|---|---|---|---|
| 9,781,148 B2 | 10/2017 | Mahaffey et al. | |
| 9,923,920 B1 | 3/2018 | Falkowitz et al. | |
| 2012/0323829 A1* | 12/2012 | Stokes | G06K 9/6224 706/12 |
| 2013/0326625 A1* | 12/2013 | Anderson | G06F 21/566 726/23 |
| 2015/0295945 A1* | 10/2015 | Canzanese, Jr. | G06F 21/53 726/23 |
| 2016/0323295 A1* | 11/2016 | Joram | G06F 21/566 |
| 2017/0155671 A1 | 6/2017 | Hovor et al. | |
| 2018/0183815 A1* | 6/2018 | Enfinger | H04L 63/145 |

OTHER PUBLICATIONS

Mavroeidis et al., "Cyber Threat Intelligence Model: An Evaluation of Taxonomies, Sharing Standards, and Ontologies within Cyber Threat Intelligence." IEEE; Sep. 2017. pp. 9.

\* cited by examiner

*Primary Examiner* — Kevin Bechtel
*Assistant Examiner* — Quazi Farooqui
(74) *Attorney, Agent, or Firm* — Cantor Colburn LLP; Richard Wilhelm (57) ABSTRACT

Examples of techniques for discriminant power based threat detection are described herein. An aspect includes identifying a plurality of detector names associated with an indicator of compromise, wherein each of the plurality of detector names has a respective associated discriminant power. Another aspect includes determining a plurality of malware families, wherein each malware family of the plurality of malware families is linked to at least one detector name of the plurality of detector names. Another aspect includes, for each malware family of the plurality of malware families, determining a sum of the associated discriminant power of any detector names that are linked to the malware family. Another aspect includes determining that the indicator of compromise belongs to a malware family of the plurality of malware families that has a highest sum.

20 Claims, 11 Drawing Sheets

```
THREAT DATA 300

IOC1: MF2
        -DN1
        -DN2
        -DN3

IOC2: MF1
        -DN3
        -DN8
        -DN9
IOC3: MF3
        -DN3
        -DN4
        -DN5
        -DN6
        -DN7
IOC4: MF1
        -DN7
        -DN10
```

DISCRIMINANT POWER BASED THREAT DETECTION

BACKGROUND

The present techniques relate to computer systems. More specifically, the techniques relate to discriminant power based threat detection in computer systems.

Computer security has become a major concern. An attack on a computer system or on a virtual machine (VM) running on a computer system is an intentional and malicious act that tries to gain access to certain resources on the system in a way that is not intended by the system's security policy. A successful attack may exploit defects in an application program, defects in the security policy, or both. For example, an attacker may take control of an application program that has special privileges for accessing resources. By exploiting defects in the program, the attacker can access resources or information using the program's special privileges, even though system security policies or the application itself may normally prevent such accesses.

An attack may be characterized by a signature, e.g., characteristic steps that constitute the exploitation, or data that the attack sends to the application that is the target of the attack. One example type of attack is a worm. A worm may insert malicious code into an attacked computer system, e.g., piggybacking on an e-mail or spam. Then, the worm causes the inserted code to be executed on the attacked system. The attacked system repeats the attack against other computer systems, e.g., sending out emails to everyone listed in a local address book. The worm thereby copies and spreads itself from one computer to another. Other example types of attacks include trojan horses and denial of service (DOS) attacks.

All of these attacks, at the very least, waste valuable resources. A typical worm, for example, wastes computer system time by storing itself, executing, generating copies and forwarding those copies to other computers. A sufficient volume of e-mails from such a worm may slow traffic and clog an e-mail server for, in effect, a denial of service. While extra e-mails, slow web response times and/or the inability to surf certain sites may be an annoyance for the typical cyber surfer, such actions on a mission-critical computer may prove disastrous. For example, locking an air traffic control system or a nuclear power plant control system could result in serious consequential damage. With more and more systems connected to the Internet, the likelihood of such a disaster becomes increasingly likely. An attack may also access private user data that is stored on a computer system, facilitating identity theft and/or fraud.

However, stopping cyber attacks as they occur, and before they can cause a large amount of damage, is only a half measure. Once an attack is identified, sufficient data (e.g., observables) must be collected about the attack to determine the origin of the attack, modes of operation, and intention of the attacks, in order to facilitate identification of attack signatures and to identify the particular methods of spreading the malicious code that performs the attack.

SUMMARY

According to an embodiment described herein, a system can include a processor to identify a plurality of detector names associated with an indicator of compromise, wherein each of the plurality of detector names has a respective associated discriminant power. The processor can also determine a plurality of malware families, wherein each malware family of the plurality of malware families is linked to at least one detector name of the plurality of detector names. The processor can also, for each malware family of the plurality of malware families, determine a sum of the associated discriminant power of any detector names that are linked to the malware family. The processor can also determine that the indicator of compromise belongs to a malware family of the plurality of malware families that has a highest sum.

According to another embodiment described herein, a method can include identifying, via a processor, a plurality of detector names associated with an indicator of compromise, wherein each of the plurality of detector names has a respective associated discriminant power. The method can also include determining, via a processor, a plurality of malware families, wherein each malware family of the plurality of malware families is linked to at least one detector name of the plurality of detector names. The method can also include for each malware family of the plurality of malware families, determining, via a processor, a sum of the associated discriminant power of any detector names that are linked to the malware family. The method can also include determining, via a processor, that the indicator of compromise belongs to a malware family of the plurality of malware families that has a highest sum According to another embodiment described herein, an apparatus can include hardware logic to identify a plurality of detector names associated with an indicator of compromise, wherein each of the plurality of detector names has a respective associated discriminant power. The hardware logic can also determine a plurality of malware families, wherein each malware family of the plurality of malware families is linked to at least one detector name of the plurality of detector names. The hardware logic can also, for each malware family of the plurality of malware families, determine a sum of the associated discriminant power of any detector names that are linked to the malware family. The hardware logic can also determine that the indicator of compromise belongs to a malware family of the plurality of malware families that has a highest sum

DETAILED DESCRIPTION

Embodiments of discriminant power based threat detection are provided, with exemplary embodiments being discussed below in detail. A cyber attack may leave a file (e.g., malicious code) on a computer system that is the target of a cyber attack. Various indicators of compromise (IOCs) may be derived from a malicious file that is found on a computer system. An IOC may be a hash of a malicious file, or an internet protocol (IP) address or domain associated with a malicious file. In order to identify the source of a cyberattack, threat databases may hold data regarding threat actors, or malware families, and their associated IOCs. However, it is not possible for any threat database to include all possible IOCs for any threat actor, because the number of possible IOCs for any threat actor may be extremely large. For example, a malicious file may be changed often in order to evade detection by antivirus software, resulting in a large number of IOCs, or hashes, that belong to the same malware family. Therefore, identification of threat actors and associated IOCs may be labor-intensive and time-consuming.

A malicious file that is left on a computer system by a malware attack may be relatively large. Therefore, a hash of the file may be used as an IOC to identify the source of the malware attack. In some embodiments, the hash may be a 32 or 64-bit hash. In other embodiments, an IP address or domain associated with the malicious file may be used an IOC. Various IOCs may be linked to a particular malware family through observed behavior (e.g., how the attack is resolved, communicated, downloaded, detected, or used-by). A connection may be inferred between an IOC and a malware family even if there is no direct relationship. A committee-based voting mechanism based on discriminant power may be used to identify IOCs. Components or characteristics of an IOC may be identified and used to infer connections between IOCs and threat actors. These components or characteristics of an IOC may be referred to as detector names. A detector name may be a detector-specific label that a virus detector applies to the IOC based on a component or characteristic of the IOC. A detector name, as used herein, may also be referred to as a detection tag. A detection tag represent how a detecting entity (e.g., a device, process, or person) labels an object or event (i.e., the source of the IOC). A malware family may be determined for an unclassified IOC based on the discriminant power of the detector names that are determined for the IOC. A malware family, as used herein, may refer to an abstract class of threats. The abstract class may be, in various embodiments, virus families, hacker groups, a country or region that is the source of attack, the general goal of the attacks, or a campaign of large attacks. Identification of a malware family for an IOC gives a high-level abstraction of a class of a cyber attack, and may be used to properly clean up or defend against the attack, based on known intelligence regarding the class of the attack.

Discriminant-power based threat detection may include two phases in some embodiments, e.g., a preparation phase and an inference phase. The preparation phase may gather and organize threat data for use in the inference phase. In embodiments of a preparation phase, indirect links from known IOCs to malware families may be determined based on any detector names that are associated with the known IOCs. The discriminant power of each detector name may then be determined. In embodiments of the preparation phase, a threat relationship graphs may be constructed linking IOCs to malware families via detector names, and then the IOCs may be removed from the threat relationship graph to generate a discriminant power graph directly linking the detector names to the malware families. The discriminant power of a detector name may be determined based on the number of outgoing links to malware families from the detector name's node in the discriminant power graph. As additional threat data is collected (e.g., more IOCs are identified as belonging to particular malware families), the knowledge base that is constructed in the preparation phase may be expanded to incorporate the additional threat data.

The inference phase may be performed to determine the malware family associated with a newly detected IOC, which may be, for example, a file hash, a domain, or an IP address in various embodiments. Indirect links to one or more malware families may be determined based on a set of one or more detector names that are determined to be associated with the newly detected IOC. A committee may be constructed for each malware family that is linked to any detector name that is associated with a new IOC, based on the indirect links that were determined in the preparation phase. Voting may be performed on a committee basis based on the discriminant power of each detector name to determine a malware family that the new IOC most likely belongs to. In some embodiments, one or more potential IOCs may be analyzed via discriminant power based threat detection to determine whether any of the one or more potential IOCs are actually IOCs, and also to determine a most likely malware family for any actual IOCs of the one or more potential IOCs.

There are a relatively large number of virus detection systems in existence, and each virus detection system may give different possible malware family information for a particular IOC or detector name. For example, an antivirus intelligence provider (for example, Crowdstrike™) maintains a relatively large database linking known IOCs to malware families. In some embodiments, data from an antivirus intelligence provider may be used to construct the threat relationship graph in the preparation phase. In another example, an antivirus aggregator (for example, VirusTotal™) maintains a database including many IOCs, including malicious hashes, that are not necessarily known to be linked to a particular malware family. The antivirus aggregator may also communicate with a large number of other detecting entities or virus detectors (e.g., antivirus databases; a detecting entity may be any appropriate device, process, or person in various embodiments) to gather threat data. In some embodiments, data from an antivirus aggregator may be used to construct the threat relationship graph in the preparation phase. In some embodiments, an antivirus aggregator may be used to determine the set of detector names that are associated with a newly detected IOC in the inference phase.

Figure 1:
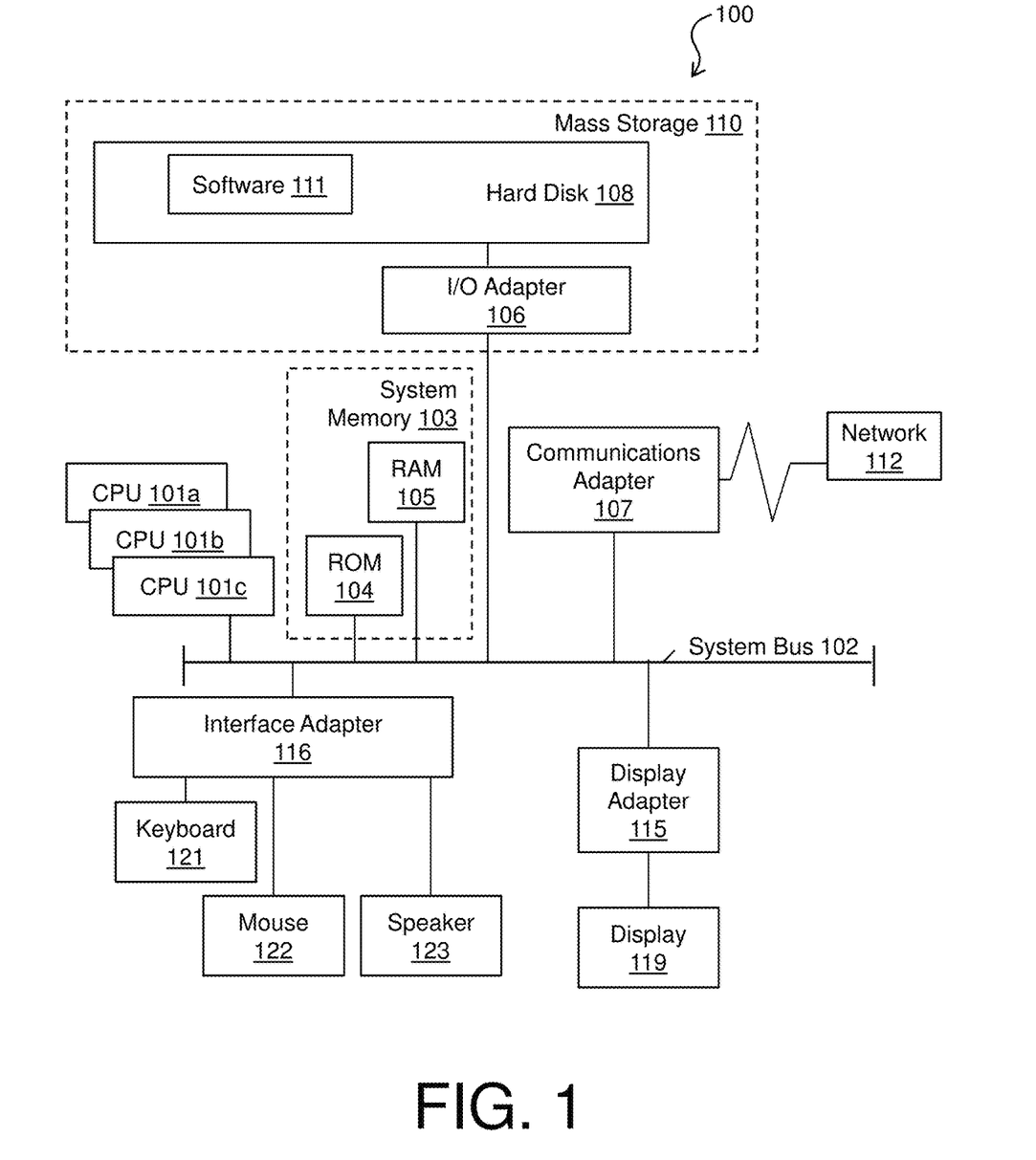
FIG. 1 is a block diagram of an example computer system for use in conjunction with discriminant power based threat detection.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
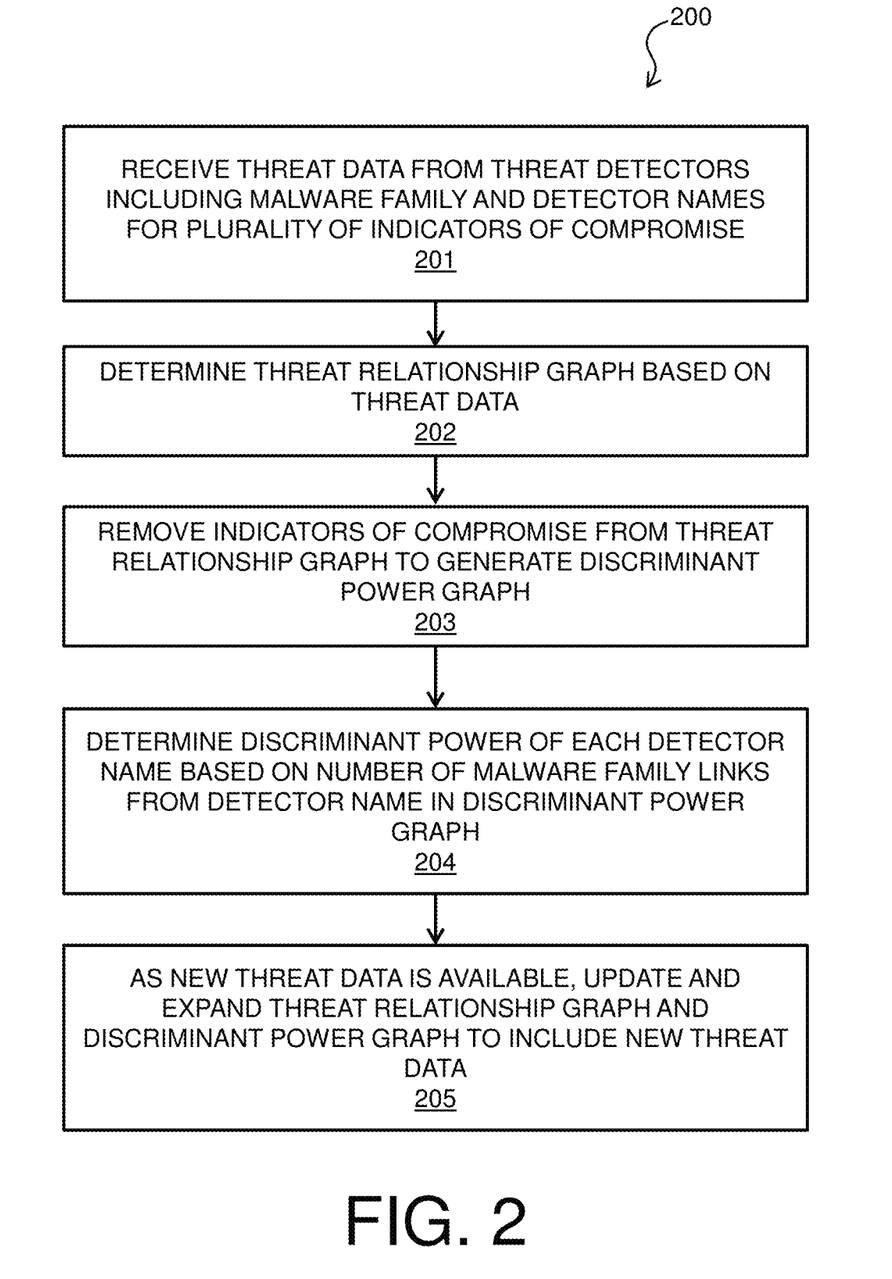
FIG. 2 is a process flow diagram of an example method for a preparation phase for discriminant power based threat detection.

FIG. 2 is a process flow diagram of an example method for a preparation phase for discriminant power based threat detection. The method 200 can be implemented with any suitable computing device, such as the computer system 100 of FIG. 1. Method 200 of FIG. 2 is performed in order to gather and organize threat data for use in an inference phase of discriminant power based threat detection, which is discussed below with respect to FIG. 5. In block 201, threat data including a number of known IOCs (such as file hashes, domains, and/or IP addresses associated with a known malware attack), and any detector names and malware families that are associated with the known IOCs, are received from one or more virus detectors. Each IOC may be associated with multiple detector names. Some example detector names include "trojan", "win32", "inject", "agent", and "ddxpxr". Each IOC may also be associated with one or more known malware families, such as, for example, "FancyBear", "GrandCrab", "PandaZeus", "BambooSpider", or "CoreBot". The associations between IOCs, detector names, and malware families may be given by one or more virus detection systems, which may include one or more antivirus aggregators or antivirus intelligence providers in various embodiments. Example threat data is discussed below with respect to FIG. 3.

Next, in block 202, a threat relationship graph is built based on the threat data that was obtained in block 201. The threat relationship graph gives the connections between IOCs, detector names, and malware families in the threat data that was received in block 201. An example threat relationship graph is discussed below with respect to FIG. 4A. In block 203, the IOCs are removed from the threat relationship graph to generate a discriminant power graph, which shows the relationships between the detector names and the malware families. An example discriminant power graph is discussed below with respect to FIG. 4B.

In block 204, the discriminant power of each detector name is determined based on the discriminant power graph that was generated in block 203. The discriminant power of a detector name may be determined based on a number of malware families that are linked to the detector name. There may be an inverse relationship between the discriminant power of a detector name and the number of malware families that are linked to the detector name in the discriminant power graph in some embodiments. For example, if a first example detector name is linked to a single malware family, that detector name may be said to have high discriminant power, as it is a good indicator that an IOC associated with that detector name belongs to that single malware family. If a second example detector name is linked to two malware families, the second detector name may have lower discriminant power than the first detector name, because it may not be possible to determine to which of the two linked malware families an IOC that is associated with the second detector name belongs based on the second detector name.

Figure 7A:
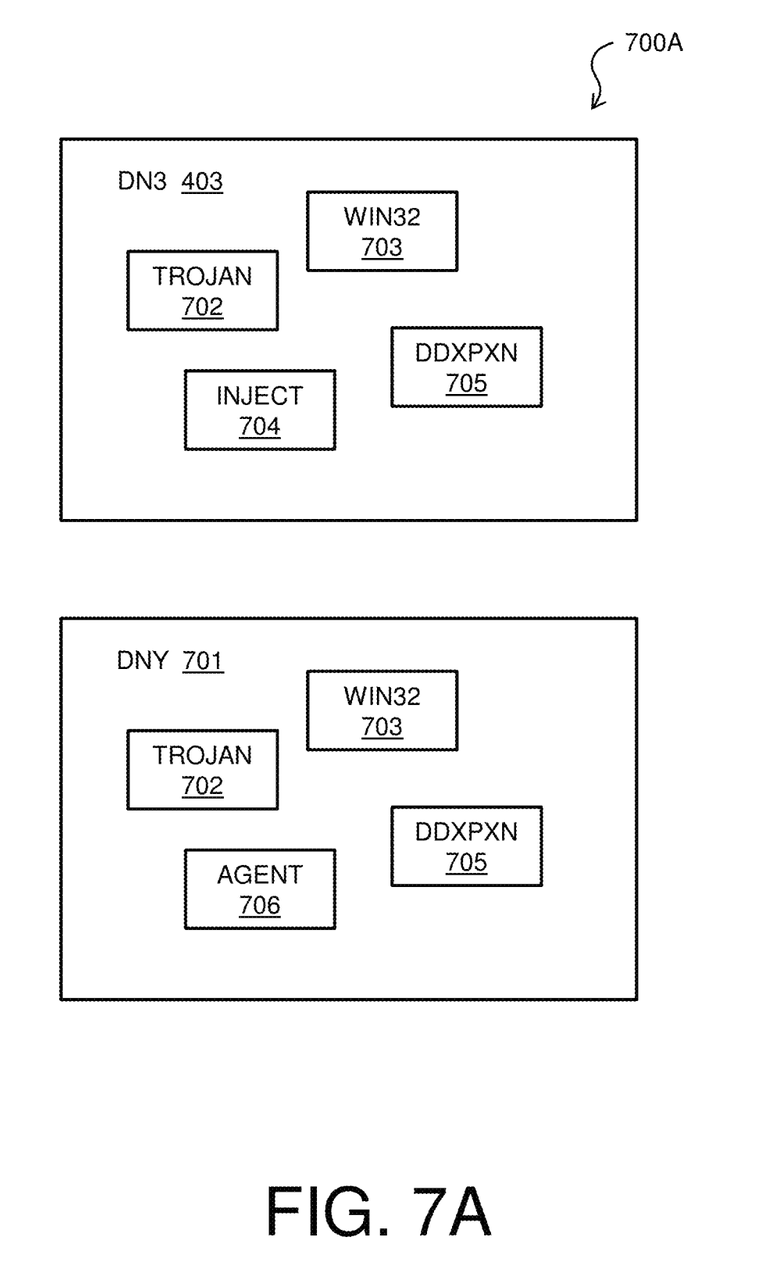
FIGS. 7A-B are graphs illustrating an example embodiment of node expansion for discriminant power based threat detection.
Figure 7B:
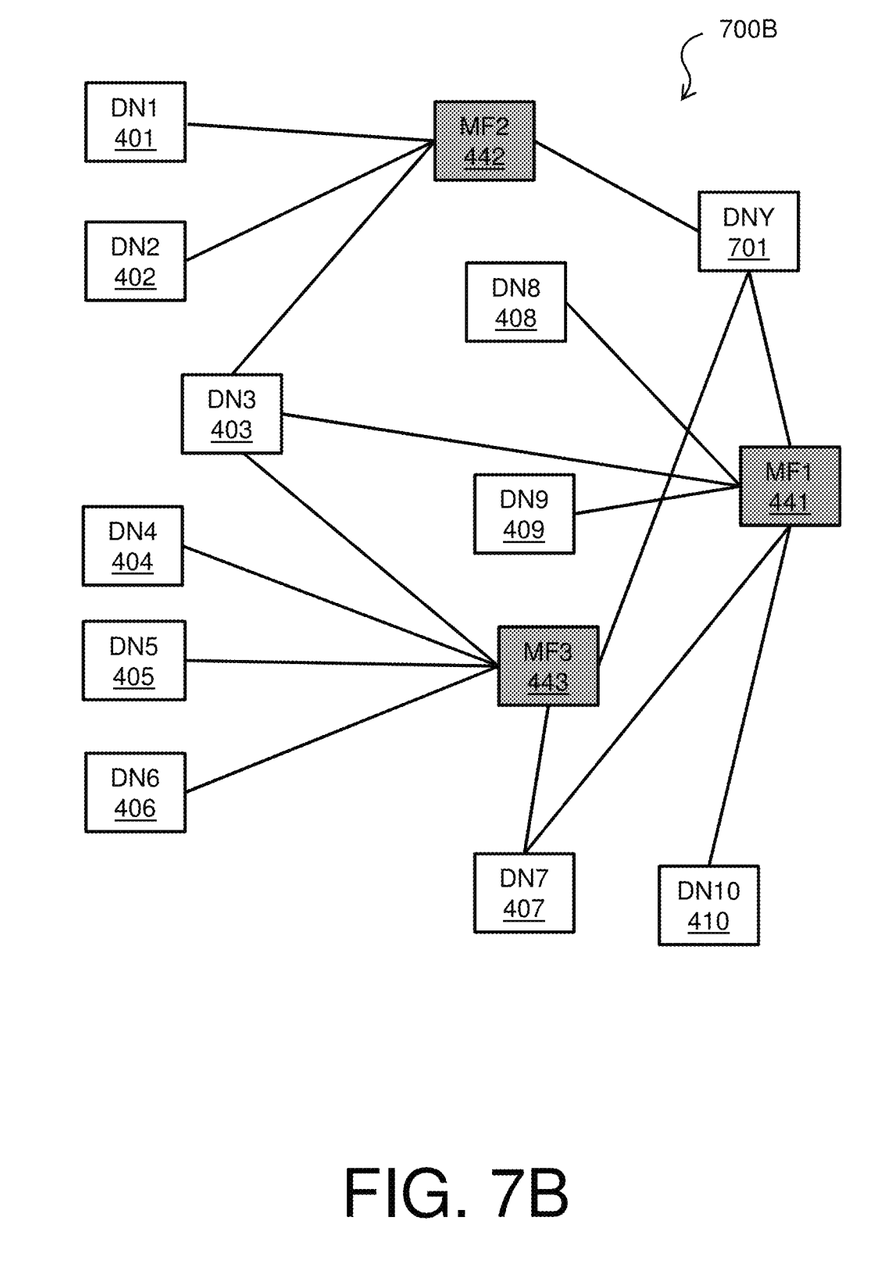

In block 205, as new threat data becomes available, the threat relationship graph and discriminant power graph may be updated and expanded to include the new threat data as described with respect to blocks 202 and 203, and the discriminant power for the detector names may be updated based on the updated graphs as described with respect to block 204. If any detector name in the new threat data includes components related to detector names that are already in the discriminant power graph, such a detector name may inherit links belonging to the detector names that are already in the discriminant power graph. This inheritance may be referred to as committee expansion; an example is shown in FIGS. 7A-B, which is discussed below.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
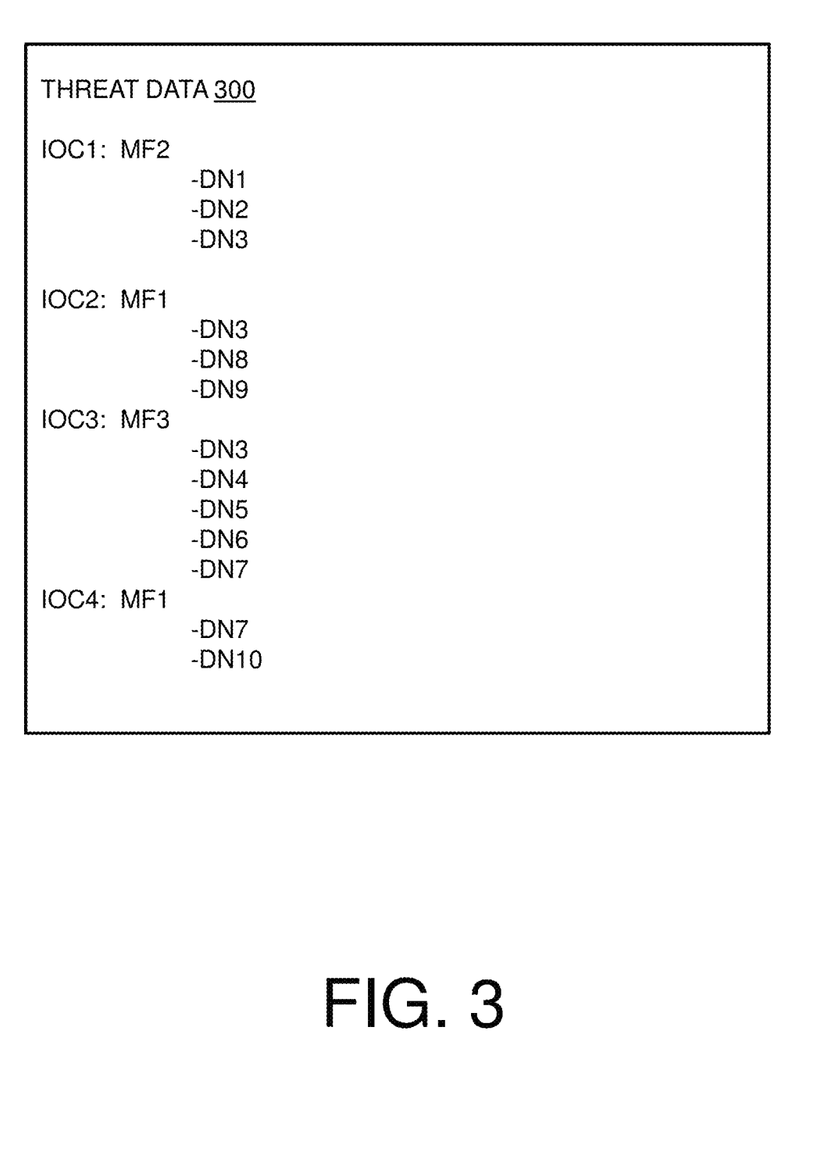
FIG. 3 a block diagram depicting example threat data for discriminant power based threat detection.

FIG. 3 illustrates an embodiment of example threat data 300, such as may be obtained in blocks 201 and/or 205 of method 200 FIG. 2. The threat data 300 that is shown in FIG. 3 includes a plurality of known IOCs, i.e., IOC1, IOC2, IOC3, and IOC4. Each IOC is known to be associated with a single malware family (MF), e.g., IOC1 is associated with MF2; IOC2 is associated with MF1; IOC3 is associated with MF3, and IOC4 is associated with MF1. Each IOC is also associated with one or more detector names (DNs). As shown in FIG. 3, IOC1 is associated with DN1, DN2, and DN3; IOC2 is associated with DN3, DNB, and DN9; IOC3 is associated with DN3, DN4, DN5, DN6, and DN7; and IOC4 is associated with DN7 and DN10. In some embodiments, in order to be used in the preparation phase that is described by to method 200 of FIG. 2, an IOC must have one or more known associated detector names, and a known malware family. Therefore, in some embodiments, IOC1, IOC2, IOC3, and IOC4 may be IOCs that are known to both of an antivirus intelligence provider and an antivirus aggregator. An antivirus intelligence provider gives associations between known IOCs and malware families. An antivirus aggregator determines detector names for a given IOC by querying a number of virus detectors (e.g., antivirus databases); an antivirus aggregator may give multiple detector names for the same IOC. FIG. 3 is shown for illustrative purposes only; threat data may include any appropriate number of IOCs, detector names, and malware families, and the IOCs, detector names, and malware families may be associated in any appropriate manner in various embodiments.

Figure 4A:
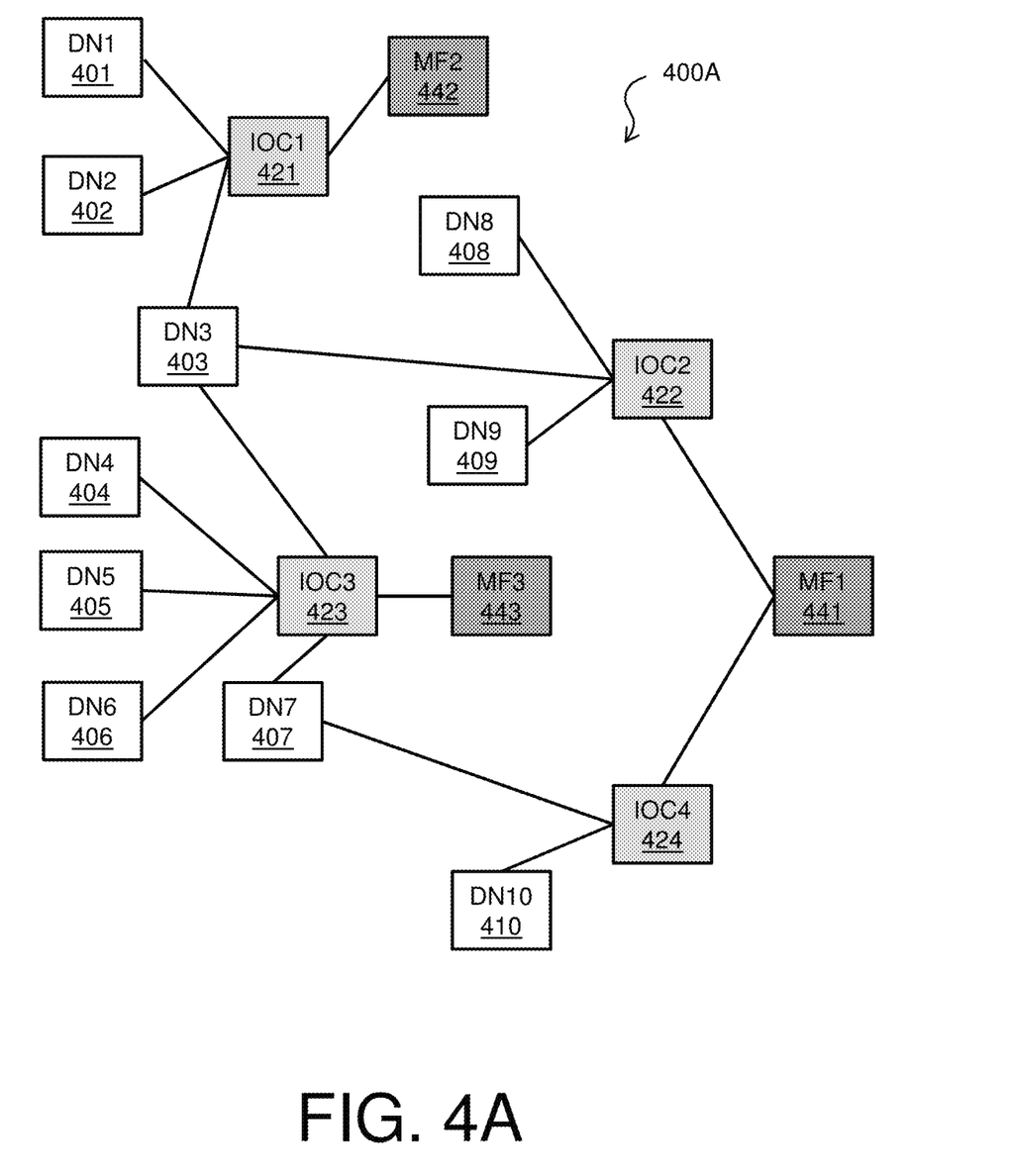
FIG. 4A is an example threat relationship graph for discriminant power based threat detection.

FIG. 4A illustrates an embodiment of an example threat relationship graph 400A, as may be generated in block 202 of method 200 of FIG. 2, that is constructed based on the example threat data 300 of FIG. 3. As shown in threat relationship graph 400A of FIG. 4A, DN1 401 is associated with IOC1 421; DN2 402 is associated with IOC1 421; DN3 403 is associated with IOC1 421, IOC2 422, and IOC3 423; DN4 404 is associated with IOC3 423; DN5 405 is associated with IOC3 423; DN6 406 is associated with IOC3 423; DN7 407 is associated with IOC3 423 and IOC4 424; DN8 408 is associated with IOC2 422; DN9 409 is associated with IOC2 422; and DN10 410 is associated with IOC4 424. Further, IOC1 421 is associated with MF2 442; IOC2 422 is associated with MF1 441; IOC3 423 is associated with MF3 443; and IOC4 424 is associated with MF1 441.

FIG. 4A is shown for illustrative purposes only; a threat relationship graph may include any appropriate number of IOCs, detector names, and malware families, and the IOCs, detector names, and malware families may be connected in any appropriate manner in various embodiments.

Figure 4B:
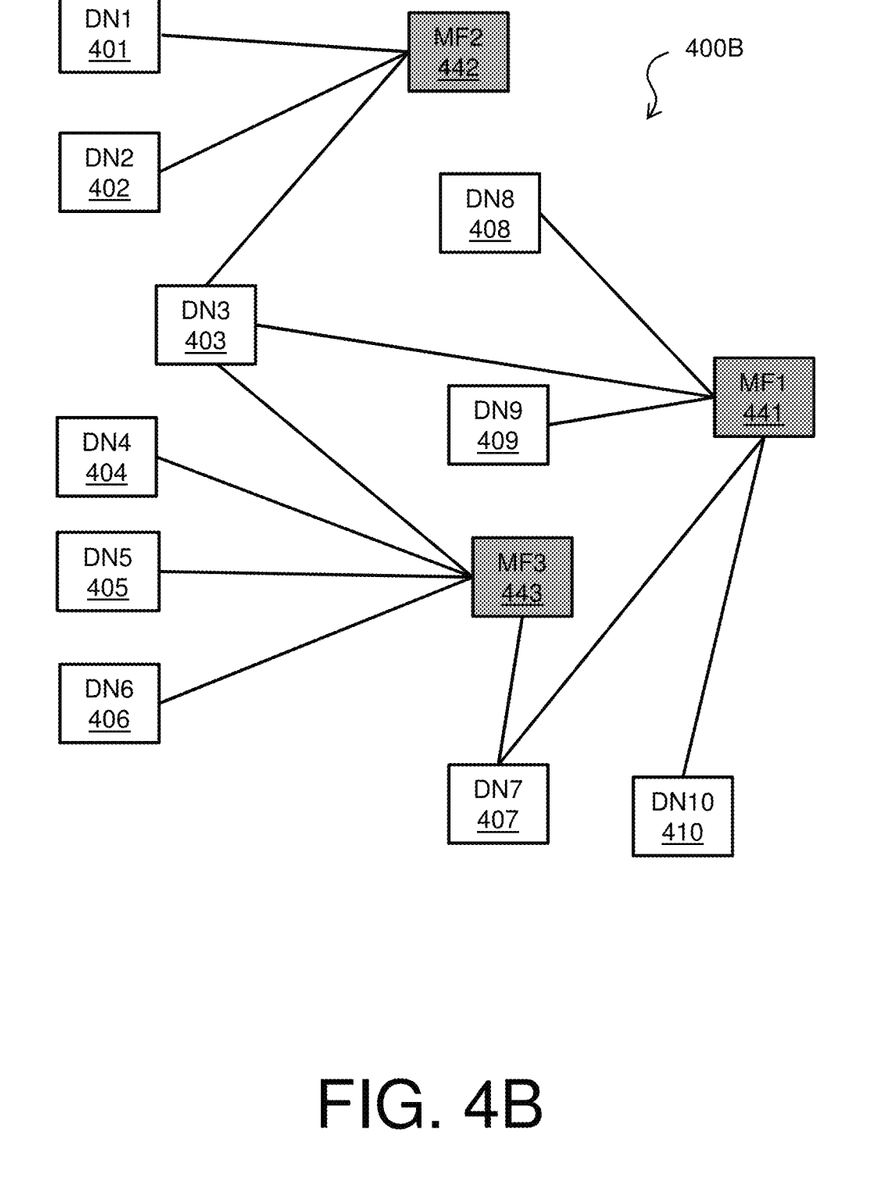
FIG. 4B is an example discriminant power graph for discriminant power based threat detection.

FIG. 4B illustrates an embodiment of an example discriminant power graph 400B, as may be generated in block 203 of FIG. 2, that is constructed based on the threat relationship graph 400A of FIG. 4A. In order to generate a discriminant power graph such as is shown in FIG. 4B, the IOCs are removed from the threat relationship graph, giving the direct relationships between the detector names and malware families. In discriminant power graph 400B, DN1 401 is associated with MF2 442; DN2 402 is associated with MF2 442; DN3 403 is associated with MF2 442, MF1 441, and MF3 443; DN4 404 is associated with MF3 443; DN5 405 is associated with MF3 443; DN6 406 is associated with MF3 443; DN7 407 is associated with MF3 443 and MF1 441; DN8 408 is associated with MF1 441; DN9 409 is associated with MF1 441; and DN10 410 is associated with MF1 441.

The discriminant power of a detector name (such as DNs 401-410) may be determined based on the number of outgoing links from the detector name in the discriminant power graph. There may be an inverse relationship between the discriminant power of a detector name and the number of outgoing links from the detector name in some embodiments. For example, DN 1 401 may have a discriminant power of 1, because DN1 401 only points to MF2 442. Therefore, any IOC that is associated with DN1 401 may likely belong to MF2 442. DN3 403 may have a discriminant power of ⅓, because DN3 is associated with multiple malware families MF1 441, MF2 442, and MF3 443. DN7 407 may have a discriminant power of ½, because DN7 407 is associated with both MF3 443 and MF1 441. In some embodiments, a detector name that may be associated with a larger number of malware families may have a lower discriminant power. In some embodiments, the discriminant power of a detector name may be equal to 1 divided by the number of malware families associated with the detector name; however, this is given for illustrative purposes only. The discriminant power of a detector name may be determined in any appropriate manner in various embodiments.

FIG. 4B is shown for illustrative purposes only; a discriminant power graph may include any appropriate number of detector names and malware families, and the detector names and malware families may be connected in any appropriate manner in various embodiments.

Figure 5:
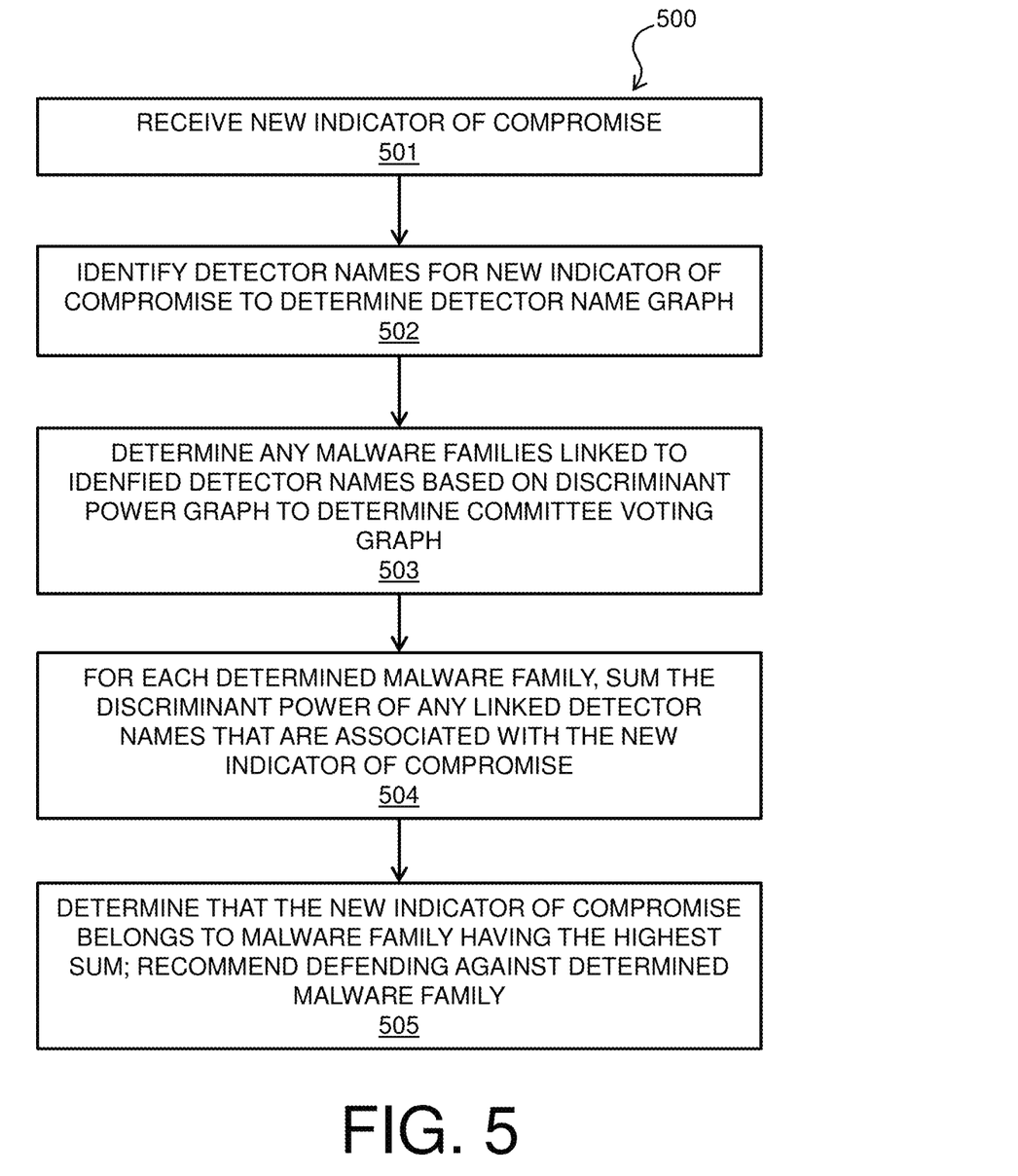
FIG. 5 is a process flow diagram of an example method for an inference phase for discriminant power based threat detection.

FIG. 5 is a process flow diagram of an example method for an inference phase for discriminant power based threat detection. The method 500 can be implemented with any suitable computing device, such as the computer system 100 of FIG. 1. Method 500 of FIG. 5 may use a discriminant power graph that is generated according to method 200 of FIG. 2 in order to identify one or more malware families associated with a new IOC. In block 501 of FIG. 5, a new IOC is received. The new IOC may be related to a malicious file that was left on a computer system, such as computer system 100 of FIG. 1, by a malware attack. The new IOC may comprise a hash of the malicious file (e.g., a 32 bit or 64-bit hash), or an IP address or domain associated with the malicious file in various embodiments. Next, in block 502, any detector names associated with the new IOC are determined. The detector names may be determined by, for example, querying an antivirus aggregator based on the new IOC. The antivirus aggregator may query a relatively large number of virus detectors (e.g., antivirus databases) to determine any possible detector names that are associated with the new IOC. A detector name graph may be constructed for the new IOC in block 502 based on the determined detector names. In block 503, any malware families linked to the detector names that were identified in block 502 are determined based on a discriminant power graph that was constructed according to method 200 of FIG. 2 (such as example discriminant power graph 400B of FIG. 4B). A committee voting graph may be constructed for the new IOC in block 503 based on the determined malware families. In block 504, for each malware family that was identified in block 503, the discriminant power for each detector name that points to that malware family is summed. For each malware family, one or more detector names may point to that malware family. The group of detector names that point to a single malware family may be referred to as a committee. Each detector name in a malware family's committee may have a different discriminant power (as given by a discriminant power graph that is constructed according to method 200 of FIG. 2), which determines a weight given to that detector name's link to the malware family. In block 505, it is determined that the IOC most likely belongs to the malware family that has the highest sum that was determined in block 504. Once the malware family is determined for the new IOC in block 505, the computer network or system on which the IOC was found may be defended or cleaned up based on any remediation measures that are known for the determined malware family.

In some embodiments of method 500 of FIG. 5, one or more potential IOCs may be analyzed to determine whether any of the one or more potential IOCs are actually IOCs, and also to determine a most likely malware family for any actual IOCs of the one or more potential IOCs. A possible malware attack may leave various observables on a computer system, and the observables may be analyzed as potential IOCs. In block 501 of FIG. 5, an observable may be identified as a potential IOC, and in block 502 of FIG. 5, any detector names may be identified for the observable. If no detector names are identified for the observable in block 502, it may be determined that the observable is not an IOC, and method 500 ends. If one or more detector names are identified for the observable in block 502, it is determined that the observable is an IOC, and flow proceeds to block 503. In block 503, one or more malware families for the one or more detector names may be identified, and discriminant-power based voting may be performed in block 504 to identify a malware family for the observable in block 505.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6A:
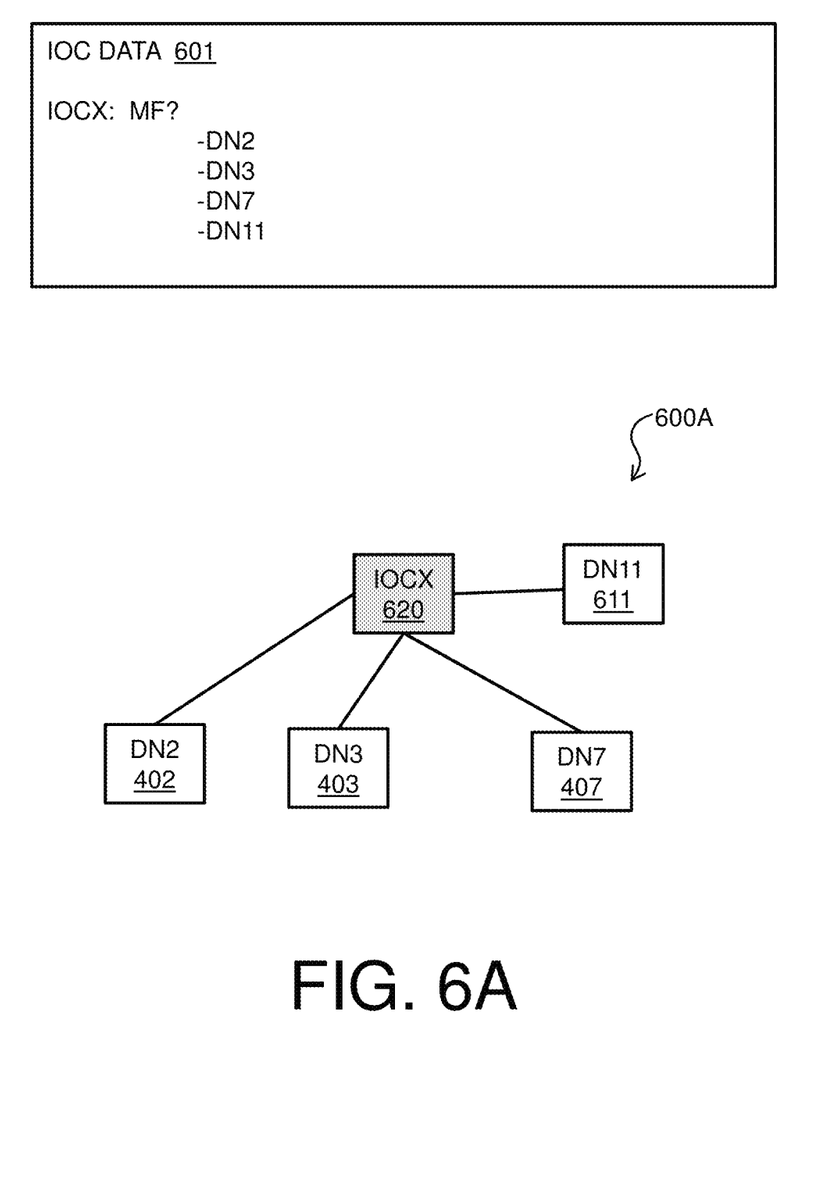
FIGS. 6A-B are block diagrams illustrating an example embodiment of an inference phase for discriminant power based threat detection.
Figure 6B:
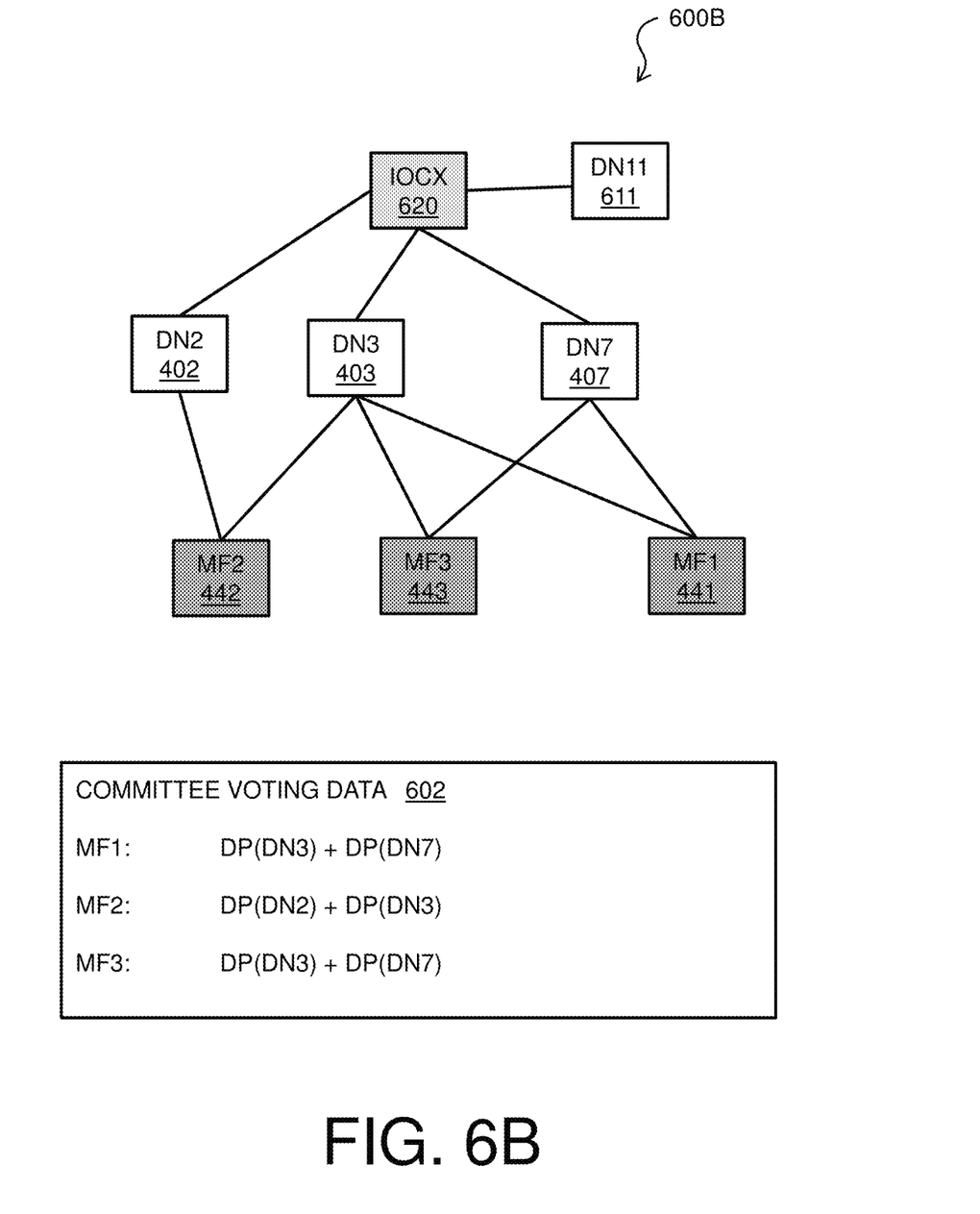

An example embodiment of the application of method 500 of FIG. 5 is illustrated in FIGS. 6A-B. IOCX may be received in block 501. FIG. 6A shows IOC data 601 corresponding to a new IOCX for which the malware family is unknown. The IOC data 601 includes a plurality of detector names, i.e., DN2, DN3, DN7, and DN11, that are identified in block 502 as being associated with IOCX. A detector name graph 600A as shown in FIG. 6A may be constructed in block 502 of FIG. 5 based on the IOC data 601, showing the IOCX 620 and its associated detector names DN2 402, DN3 403, DN7 407, and DN11 611. Then, in block 503, any malware families associated with the detector names are identified based on discriminant power graph 400B of FIG. 4B, and added to the detector name graph 600A to generate a committee voting graph 600B as shown in FIG. 6B. The example committee voting graph 600B of FIG. 6B shows that DN2 402 is associated with MF2 442; DN3 403 is associated with MF2 442, MF3 442 and MF1 441; and DN7 407 is associated with MF3 443 and MF1 441. DN11 611 is not included in the discriminant power graph 400B and therefore is not associated with any known malware family.

In block 504, the voting scores for each malware family are determined, as shown in committee voting data 602 for IOCX of FIG. 6B, based on the committee voting graph 600B. For each malware family, the discriminant power (DP) of each associated detector name may be summed in block 504. The discriminant power of a detector name may be determined based on the number of malware families that are linked to the detector name in the committee voting graph 600B. There may be an inverse relationship between discriminant power and a number of associated malware families for a detector name in some embodiments, therefore, in such embodiments, a detector name that is linked to a larger number of malware families may have a lower discriminant power. For example, for MF2 442, DN2 402 may have a discriminant power of 1, and DN3 403 may have a discriminant power of $\frac{1}{3}$, giving a total of 4/3. For MF3 443, DN3 403 may have a discriminant power of $\frac{1}{3}$, and DN7 407 may have a discriminant power of $\frac{1}{2}$, giving a total of $\frac{5}{6}$. For MF1 441, DN3 403 may have a discriminant power of $\frac{1}{3}$, and DN7 407 may have a discriminant power of $\frac{1}{2}$, giving a total of $\frac{5}{6}$. DN11 411 is not associated with any malware family and therefore cannot vote. Therefore, it is determined in block 505 of FIG. 5 that IOCX most likely belongs to MF2, based on the committee voting data 602. Measures may be taken to guard against MF2 in the computer system on which IOCX was found.

FIGS. 6A-B are shown for illustrative purposes only; IOC data, a detector name graph, and a discriminant voting graph may include any appropriate number of detector names and malware families, and detector names and malware families may be connected in any appropriate manner in various embodiments. Further, the discriminant power of a detector name may be determined in any appropriate manner in various embodiments.

FIGS. 7A-B illustrates an example graphs 700A-B of node inheritance for committee expansion, which may be performed in some embodiments of block 205 of FIG. 2. In the example of FIGS. 7A-B, component parts of DN3 403 of FIGS. 4A-B are shown. In this example, DN3 403 is "Trojan.Win32.Inject.ddxpxn"; therefore, as shown in graph 700A of FIG. 7A, DN3 403 includes four component nodes: Trojan 702, Win32 703, Inject 704, and ddxpxn 705. Each of these four component nodes may have a respective discriminant power within DN 403. A new detector name DNY 701 may be added to the discriminant power graph in block 205 of FIG. 2. In this example, DNY 701 may be "Trojan.Win32.Agent.ddxpxn", and therefore have four component nodes: Trojan 702, Win32 703, Agent 706, and ddxpxn 705. For each component node that is in both DN3 403 and DNY 701, it is determined whether that component node has discriminant power. Trojan 703 and Win32 703 may be generic identifiers having low discriminant power, i.e., detector names that include Trojan or Win32 may be associated with a relatively large number of malware families. However, ddxpxn 705 may be associated with a smaller number of malware families and therefore have higher discriminant power, allowing DNY 701 to inherit the links between DN3 403 and MF1 441, MF2 42, and MF3 443 that are shown in FIG. 4B based on ddxpxn 705. The resulting discriminant power graph 700B is shown in FIG. 7B. DNY 701 may be incorporated into a committee voting graph 600B such as is shown in FIG. 6B. FIGS. 700A-B are shown for illustrative purposes only; for example, a detector name may include any appropriate number and type of component nodes.

Figure 8:
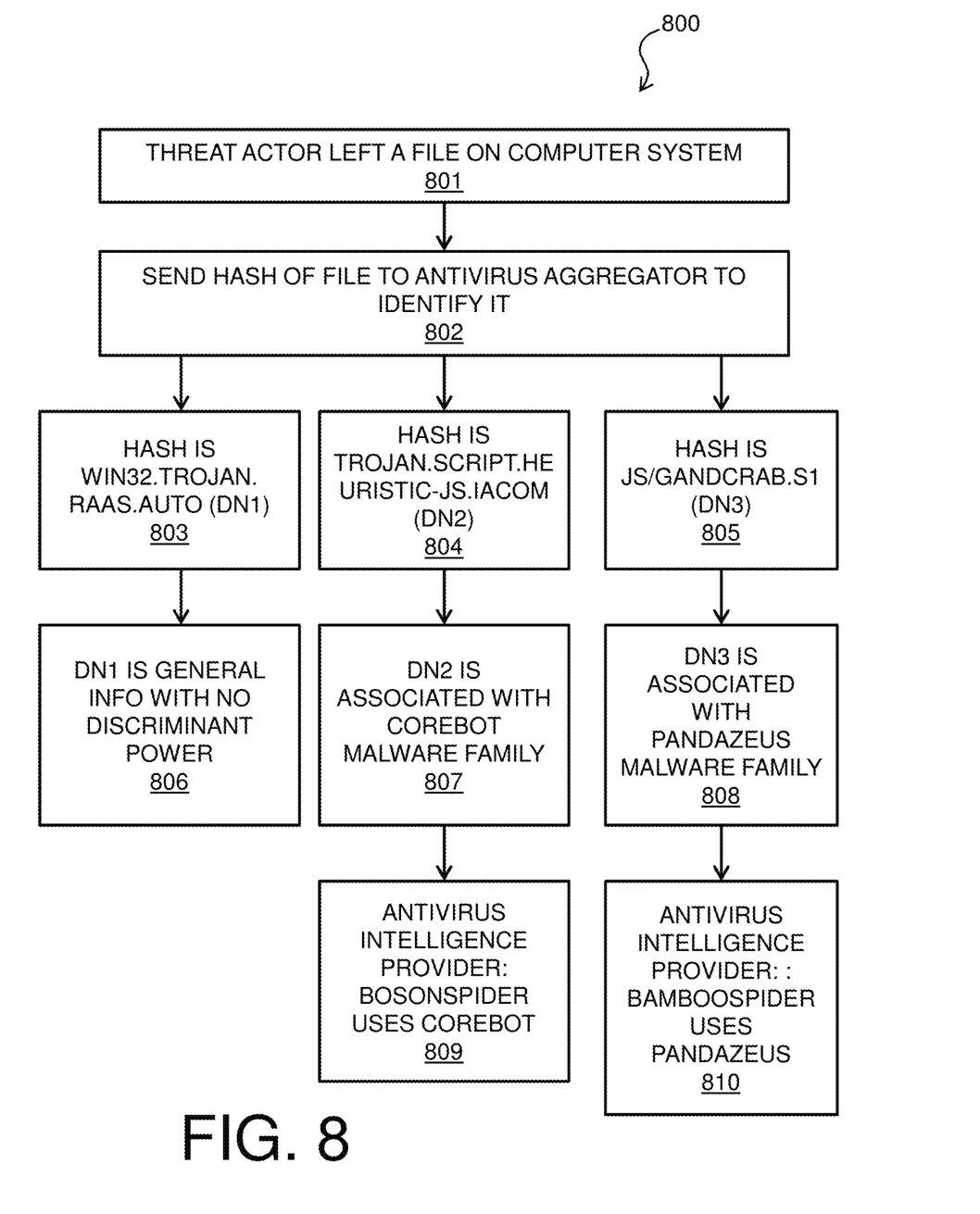
FIG. 8 is a process flow diagram illustrating an example implementation of discriminant power based threat detection.

FIG. 8 is an example embodiment of a method 800 showing an example implementation of the inference phase of method 500 of FIG. 5. In block 801, a threat actor leaves a file on a computer system, such as computer system 100 of FIG. 1. In block 802, a hash of the file (i.e., an IOC) is sent to an antivirus aggregator for identification. The antivirus aggregator may submit the hash that comprises the IOC to a large number of antivirus databases. In the example of FIG. 8, three of the antivirus databases that were queried by the antivirus aggregator return detector names for the hash in blocks 803-805. Block 803 shows that a first virus detector returns a first detector name for the hash, i.e., Win32.Trojan.Raas.Auto. Block 804 shows that a second virus detector returns a second detector name for the hash, i.e., Trojan.Script.Heuristic-JS.IAcom. Block 805 shows that a third virus detector returns a third detector name for the hash, i.e., JS/GandCrab.S1. In blocks 806-808, the discriminant powers of the three detector names given in block 803-805 are determined. It is determined in block 806 that the first detector name is a general detector name that may be associated with many malware families and therefore has low or no discriminant power. It is determined in block 807 based on a discriminant power graph such as discriminant power graph 400B of FIG. 4B that the second detector name is associated with the CoreBot malware family. It is determined in block 808 based on a discriminant power graph such as discriminant power graph 400B of FIG. 4B that the third detector name is associated with the PandaZeus malware family. In block 809, an antivirus intelligence provider determines that BosonSpider uses CoreBot. In block 810, the antivirus intelligence provider determines that BambooSpider uses PandaZeus. Based on the respective discriminant powers of the second detector name and the third detector name, the computer system may be defended against either BambooSpider or BosonSpider, or may be defended against both BambooSpider and BosonSpider in some embodiments. FIG. 8 is shown for illustrative purposes only, for example, an IOC may take any appropriate format, and may have any appropriate number of associated detector names.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor configured to:
   receive a discriminant power graph comprising links between a plurality of detector names and a plurality of malware families, wherein each of the plurality of detector names in the discriminant power graph has a respective associated discriminant power;
   receive a set of detector names associated with an indicator of compromise from an antivirus aggregator;
   determine a set of malware families, wherein each malware family of the set of malware families is linked to at least one detector name of the set of detector names in the discriminant power graph;
   for each malware family of the set of malware families, determine a sum of the associated discriminant power of any detector names that are linked to the malware family in the discriminant power graph; and
   determine that the indicator of compromise belongs to a malware family of the set of malware families that has a highest determined sum.

2. The system of claim 1, the hardware processor configured to construct the discriminant power graph, wherein constructing the discriminant power graph comprises:
   receiving threat data, the threat data comprising a plurality of known indicators of compromise, wherein each of the plurality of known indicators of compromise is associated with a malware family of the plurality of malware families and one or more detector names of the plurality of detector names in the threat data; and for each of the plurality of known indicators of compromise, indicating a link between the associated malware family and each of the one or more detector names.

3. The system of claim 2, wherein the set of malware families is determined based on the indicated links.

4. The system of claim 1, wherein the discriminant power of a detector name of the set of detector names is determined based on a number of malware families that are linked to the detector name in the discriminant power graph.

5. The system of claim 4, wherein there is an inverse relationship between the number of malware families that are linked to the detector name in the discriminant power graph and the discriminant power of the detector name.

6. The system of claim 1, wherein the indicator of compromise is determined based on a malicious file on a computer system.

7. The system of claim 6, wherein the indicator of compromise comprises one of a hash of the malicious file, an internet protocol (IP) address associated with the malicious file, and a domain associated with the malicious file.

8. The system of claim 6, wherein the processor is configured to recommend that the computer system be defended against the malware family to which the indicator of compromise belongs.

9. A computer-implemented method, comprising:
receiving, via a processor, a discriminant power graph comprising links between a plurality of detector names and a plurality of malware families, wherein each of the plurality of detector names in the discriminant power graph has a respective associated discriminant power;
receiving, via the processor, a set of detector names associated with an indicator of compromise from an antivirus aggregator;
determining, via the processor, a set of malware families, wherein each malware family of the set of malware families is linked to at least one detector name of the set of detector names in the discriminant power graph;
for each malware family of the set of malware families, determining, via the processor, a sum of the associated discriminant power of any detector names that are linked to the malware family in the discriminant power graph; and
determining, via the processor, that the indicator of compromise belongs to a malware family of the set of malware families that has a highest determined sum.

10. The computer-implemented method of claim 9, comprising constructing the discriminant power graph, wherein constructing the discriminant power graph comprises:
receiving, via the processor, threat data, the threat data comprising a plurality of known indicators of compromise, wherein each of the plurality of known indicators of compromise is associated with a malware family of the plurality of malware families and one or more detector names of the plurality of detector names in the threat data; and
for each of the plurality of known indicators of compromise, indicating, via the processor, a link between the associated malware family and each of the one or more detector names.

11. The computer-implemented method of claim 10, wherein the set of malware families is determined based on the indicated links.

12. The computer-implemented method of claim 9, wherein the discriminant power of a detector name of the set of detector names is determined based on a number of malware families that are linked to the detector name in the discriminant power graph.

13. The computer-implemented method of claim 12, wherein there is an inverse relationship between the number of malware families that are linked to the detector name in the discriminant power graph and the discriminant power of the detector name.

14. The computer-implemented method of claim 9, wherein the indicator of compromise is determined based on a malicious file on a computer system, and wherein the indicator of compromise comprises one of a hash of the malicious file, an internet protocol (IP) address associated with the malicious file, and a domain associated with the malicious file.

15. A computer program product comprising a non-transitory computer readable storage medium having program instructions embodied therewith, the program instructions executable by one or more processors to cause the one or more processors to perform operations comprising:
receiving a discriminant power graph comprising links between a plurality of detector names and a plurality of malware families, wherein each of the plurality of detector names in the discriminant power graph has a respective associated discriminant power;
receiving a set of detector names associated with an indicator of compromise from an antivirus aggregator;
determining a set of malware families, wherein each malware family of the set of malware families is linked to at least one detector name of the set of detector names in the discriminant power graph;
for each malware family of the set of malware families, determining a sum of the associated discriminant power of any detector names that are linked to the malware family in the discriminant power graph; and
determining that the indicator of compromise belongs to a malware family of the set of malware families that has a highest determined sum.

16. The computer program product of claim 15, wherein the operations further comprise constructing the discriminant power graph, wherein constructing the discriminant power graph comprises:
receiving threat data, the threat data comprising a plurality of known indicators of compromise, wherein each of the plurality of known indicators of compromise is associated with a malware family of the plurality of malware families and one or more detector names of the plurality of detector names in the threat data; and
for each of the plurality of known indicators of compromise, indicating a link between the associated malware family and each of the one or more detector names.

17. The computer program product of claim 16, wherein the set of malware families is determined based on the indicated links.

18. The computer program product of claim 15, wherein the discriminant power of a detector name of the set of detector names is determined based on a number of malware families that are linked to the detector name in the discriminant power graph.

19. The computer program product of claim 18, wherein there is an inverse relationship between the number of malware families that are linked to the detector name in the discriminant power graph and the discriminant power of the detector name.

20. The computer program product of claim 15, wherein the indicator of compromise is determined based on a malicious file on a computer system, and wherein the indicator of compromise comprises one of a hash of the malicious file, an internet protocol (IP) address associated with the malicious file, and a domain associated with the malicious file.

* * * * *